(12) United States Patent
Vajravel et al.

(10) Patent No.: US 10,620,835 B2
(45) Date of Patent: Apr. 14, 2020

(54) ATTACHING A WINDOWS FILE SYSTEM TO A REMOTE NON-WINDOWS DISK STACK

(71) Applicant: Wyse Technology L.L.C., Santa Clara, CA (US)

(72) Inventors: Gokul Thiruchengode Vajravel, Bangalore (IN); Ramanujam Kaniyar Venkatesh, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 279 days.

(21) Appl. No.: 15/417,914

(22) Filed: Jan. 27, 2017

(65) Prior Publication Data

US 2018/0217763 A1    Aug. 2, 2018

(51) Int. Cl.
*G06F 3/06* (2006.01)

(52) U.S. Cl.
CPC ............ *G06F 3/0605* (2013.01); *G06F 3/067* (2013.01); *G06F 3/0661* (2013.01)

(58) Field of Classification Search
CPC .... G06F 3/0619; G06F 3/0643; G06F 3/0659; G06F 3/0665; G06F 3/0689
See application file for complete search history.

(56) References Cited

U.S. PATENT DOCUMENTS

| | | | | |
|---|---|---|---|---|
| 8,010,630 B2 * | 8/2011 | Barreto | ............ | H04L 29/08846 709/219 |
| 2004/0233910 A1 * | 11/2004 | Chen | .................. | H04L 67/1097 370/395.5 |
| 2005/0114595 A1 * | 5/2005 | Karr | ...................... | G06F 3/0607 711/114 |
| 2008/0144142 A1 * | 6/2008 | Reece | ..................... | G06F 3/061 358/520 |
| 2009/0150909 A1 * | 6/2009 | Barreto | ................. | G06F 9/4411 719/324 |
| 2010/0198889 A1 * | 8/2010 | Byers | .................... | G06F 17/302 707/827 |
| 2013/0091101 A1 * | 4/2013 | Eslami Sarab | ..... | G06F 17/3007 707/690 |
| 2015/0261439 A1 * | 9/2015 | Kumar | ................... | G06F 3/061 711/102 |
| 2016/0342358 A1 * | 11/2016 | Otaka | ................... | G06F 3/0631 |

* cited by examiner

*Primary Examiner* — Jay A Morrison
*Assistant Examiner* — Xiaoqin Hu
(74) *Attorney, Agent, or Firm* — Kirton McConkie; Brian Tucker

(57) ABSTRACT

A Windows file system can be attached to a remote non-Windows disk stack thereby allowing a mass storage device to be redirected at the disk level even though a client terminal is running a non-Windows operating system. A client-side proxy can include a disk provider that is configured to obtain disk information from a mass storage device connected to the client terminal and provide it to the server-side agent. A virtual disk enumerator on the server can employ the disk information to emulate a disk stack so that a Windows specific file system can be loaded on the server. Any Windows-specific management commands that target the mass storage device can be handled by the virtual disk enumerator using the disk information, whereas any access commands can be routed to the disk provider which can interface with a non-Windows disk stack on the client terminal for handling.

19 Claims, 14 Drawing Sheets

ATTACHING A WINDOWS FILE SYSTEM TO A REMOTE NON-WINDOWS DISK STACK

CROSS-REFERENCE TO RELATED APPLICATIONS

N/A

BACKGROUND

The present invention is generally directed to the redirection of mass storage devices in a virtual desktop infrastructure (VDI) environment. Device redirection generally refers to making a device that is connected to a client terminal accessible within a virtual desktop as if the device had been physically connected to the virtual desktop. In other words, when device redirection is implemented, a user can connect a device to his or her client terminal and the device will function as if it had been connected to the server.

FIGS. 1 and 2 and the following description will provide a general overview of how device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client terminal 102 can remotely access applications and data at the server 104 from the client terminal 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client terminal 102 may initiate a remote session with server 104 by sending a request for remote access and credentials (e.g., login name and password) to server 104. If server 104 accepts the credentials from client terminal 102, then server 104 may establish a remote session, which allows a user at client terminal 102 to access applications and data at server 104. During the remote session, server 104 sends display data to client terminal 102 over network 106, which may include display data of a desktop and/or one or more applications running on server 104. The desktop may include, for example, icons corresponding to different applications that can be launched on server 104. The display data allows client terminal 102 to locally display the desktop and/or applications running on server 104.

During the remote session, client terminal 102 may send user commands (e.g., inputted via a mouse or keyboard at client terminal 102) to server 104 over network 106. Server 104 may process the user commands from client terminal 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client terminal 102. Client terminal 102 locally displays the updated display data so that the user at client terminal 102 can view changes at server 104 in response to the user commands. Together, these aspects allow the user at client terminal 102 to locally view and input commands to the desktop and/or application that is running remotely on server 104. From the perspective of the client side, the desktop running on server 104 may represent a virtual desktop environment.

Windows I/O uses a layered architecture where device drivers are on a device stack. In a basic model, the top of the stack is the file system. Next is the volume manager, followed by the disk driver. At the bottom of the device stack are the port and miniport drivers. When an I/O request reaches the file system, it takes the block number of the file and translates it to an offset in the volume. The volume manager then translates the volume offset to a block number on the disk and passes the request to the disk driver. When the request reaches the disk driver it will create a Command Descriptor Block (CDB) that will be sent to the SCSI device. The disk driver imbeds the CDB into a structure called the SCSI_REQUEST_BLOCK (SRB). This SRB is sent to the port driver as part of the I/O request packet (IRP).

The port driver does most of the request processing including providing timing services for requests, enforcing queue depth (making sure that a device does not get more requests that it can handle), and building scatter gather arrays for data buffers. The port driver interfaces with a driver called the miniport. The miniport driver is designed by the hardware manufacturer to work with a specific adapter and is responsible for taking requests from the port driver and sending them to the target logical unit number (LUN). The port driver calls the HwStorStartIo( ) function to send requests to the miniport, and the miniport will send the requests to the LUN. When the request is complete, the miniport will call StorPortNotification( ) with the NotificationType parameter value set to RequestComplete, along with a pointer to the completed SRB.

FIG. 2 is a block diagram of a virtual desktop infrastructure (VDI) environment 200 which can implement this type of functionality when a mass storage device is redirected from a client terminal 102 to a server 104 over a remote session. As shown, while client terminal 102 has established a remote session with server 104, a mass storage device 240 is connected to client terminal 102. In accordance with embodiments of the present invention, client terminal 102 can be configured to redirect device 240 over the remote session so that the device is accessible on server 104. Proxy 210 on client terminal 102 and agent 250 on server 104 can be configured to establish and maintain the remote session to enable this redirection.

FIG. 2 provides a general overview of the primary components that can be employed to redirect mass storage device 240 at the disk level. This technique can be referred to as disk level redirection and is distinguished from general USB redirection in that the redirection occurs at the disk level rather than at the USB device level. In particular, client terminal 102 can include a disk driver stack 220 that includes a disk driver 220a, a USB storage driver 220b, and a USB hub driver 220c. As is known in the art, USB storage driver 220b and USB hub driver 220c can implement the USB protocol to enable communication with device 240 as a USB mass storage device. Disk driver 220a, which in some embodiments may be an instance of the disk.sys process, can function to service read/write requests and to abstract the underlying USB storage and hub drivers 220b, 220c.

When mass storage device 240 is connected to client terminal 102, disk driver 220a may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, disk driver 220 redirects device 240 to server 104 via proxy 210.

Agent 250 may be configured to receive the report from proxy 210 that device 240 is connected to client terminal 102 and the device information. Agent 250 may further be configured to associate with the report from proxy 210 one or more identifiers for client terminal 102 and/or for a user session through which client terminal 102 is connected to server 104, such as a session number or a session locally unique identifier (LUID). Agent 250 can provide notification of device 240, along with the device information, to virtual disk enumerator 260. Virtual disk enumerator 260 may be configured to create and store in memory a record corresponding to device 240, the record including at least part of the device information and session identifiers received from agent 250. Virtual disk enumerator 260 may be configured to report to operating system 170 of server 104 that device 240 is connected and to provide the device information to the operating system. This allows the operating system of server to recognize the presence of device 240 even though device 240 is connected to client terminal 102.

Based on the device information, operating system 170 may load a corresponding disk driver 282, which may be another instance of the disk.sys process, which may sit below a file system stack 280 to receive and convert file system requests to disk requests (e.g., by creating a CDB and embedding it in an SRB) and to pass these disk requests (e.g., IRPs and associated SRBs) to virtual disk enumerator 260 at the bottom of the device stack. It is noted that a volume manager is not shown in this figure for simplicity. Virtual disk enumerator 260 functions to virtualize mass storage device 240 on server 104 (as represented by virtual mass storage device 290). This virtualization is accomplished by routing the disk requests to agent 250 which will forward them over the remote session to proxy 210, down through disk driver stack 220, and to mass storage device 240 where they can be fulfilled. Corresponding responses can then be routed in a reverse direction towards virtual disk enumerator 260 and up through disk driver 282, file system stack 280, operating system 170, and ultimately to an application 270 that originated the request.

It is to be understood that an IRP itself is not transferred between proxy 210 and agent 250 (since much of the IRP is server-specific (e.g., pointers) and would therefore be meaningless on the client). Instead, sufficient content of the IRP is transferred from agent 250 to proxy 210 to allow proxy 210 to recreate (or to cause to be recreated) an equivalent IRP on the client side. A similar process is employed when proxy 210 returns results of handling an IRP.

The above described disk level redirection can only be accomplished when client terminal 102 runs a version of the Windows operating system. More particularly, the disk level redirection functions by passing the Windows specific commands from server 104 (which is also running Windows) to disk driver stack 220. For example, as indicated above, disk driver 220a can be an instance of disk.sys (which is a Windows component) that is capable of handling the Windows specific commands that are redirected from server 104.

Therefore, if client terminal 102 is running a non-Windows operating system, it will not be possible to redirect mass storage device 240 at the disk level. Instead, mass storage device 240 could be redirected at the USB device level which, due to the overhead of implementing the USB protocol over a high latency network, severely limits the performance of a redirected mass storage device. Alternatively, mass storage device 240 could be redirected to server 104 using driver mapping techniques. However, driver mapping would require the file system to be present on client terminal 102 and does not support a number of disk management functionalities or software encrypted drives. For these reasons, when client terminal 102 runs a non-Windows operating system, the redirection of mass storage devices cannot be performed in an optimal manner.

BRIEF SUMMARY

The present invention extends to methods, systems, and computer program products for attaching a Windows file system to a remote non-Windows disk stack thereby allowing a mass storage device to be redirected at the disk level even though a client terminal is running a non-Windows operating system. A client-side proxy can include a disk provider that is configured to obtain disk information from a mass storage device connected to the client terminal and provide it to the server-side agent. A virtual disk enumerator on the server can employ the disk information to emulate a disk stack so that a Windows specific file system can be loaded on the server. Any Windows-specific management commands that target the mass storage device can be handled by the virtual disk enumerator using the disk information, whereas any access commands can be routed to the disk provider which can interface with a non-Windows disk stack on the client terminal for handling.

In one embodiment, the present invention is implemented by a virtual disk enumerator in a virtual desktop infrastructure environment as a method for redirecting a mass storage device. A virtual disk enumerator that is executing on a server receives disk information about a mass storage device that is connected to a client terminal that has established a remote display protocol connection with the server. The virtual disk enumerator receives a management command targeting the mass storage device and employs the disk information to send a response to the management command without sending the management command to the client terminal.

In another embodiment, the present invention is implemented as computer storage media storing computer executable instructions which when executed implement a client-side disk provider and a server-side virtual disk enumerator. When a mass storage device is coupled to a client terminal on which the disk provider is executing, the disk provider is configured to obtain disk information about the mass storage device and send the disk information to the virtual disk enumerator on the server. The virtual disk enumerator is configured to employ the disk information to directly handle management commands that target the mass storage device.

In another embodiment, the present invention is implemented as virtual desktop infrastructure comprising: a proxy that executes on a client terminal that runs a non-Windows operating system, the proxy including a disk provider; an agent that executes on a server that runs a Windows operating system, the agent being configured to establish remote display protocol connections with the proxy; and a virtual disk enumerator that executes on the server. When a mass storage device is connected to the client terminal, the disk provider obtains disk information about the mass storage device and sends the disk information to the virtual disk enumerator. The virtual disk enumerator employs the disk information to directly handle management commands that target the mass storage device and forwards access commands that target the mass storage device to the disk provider.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented as part of a virtual desktop infrastructure (VDI) environment to attach a Windows file system to a remote non-Windows disk stack thereby allowing a mass storage device to be redirected over a remote session at the disk level even though a client terminal is running a non-Windows operating system. A remote session can be established using any remote display protocol including, for example, Microsoft's Remote Desktop Protocol (RDP), Citrix's Independent Computing Architecture (ICA), VMWare's PC-over-IP (PCoIP), Dell's vWorkspace (EOP), etc.

In this specification, a distinction will be made between IO commands that require accessing contents of a file system on a mass storage device and IO commands that do not require such access. The former will be referred to as "access commands" and include read and write commands and other commands that are required to perform reads and writes (e.g., disk open and close commands). The latter will be referred to as "management commands" to denote that such commands are employed to obtain information about a mass storage device and/or a file system on a mass storage device to enable a system to properly access the device.

Figure 1:
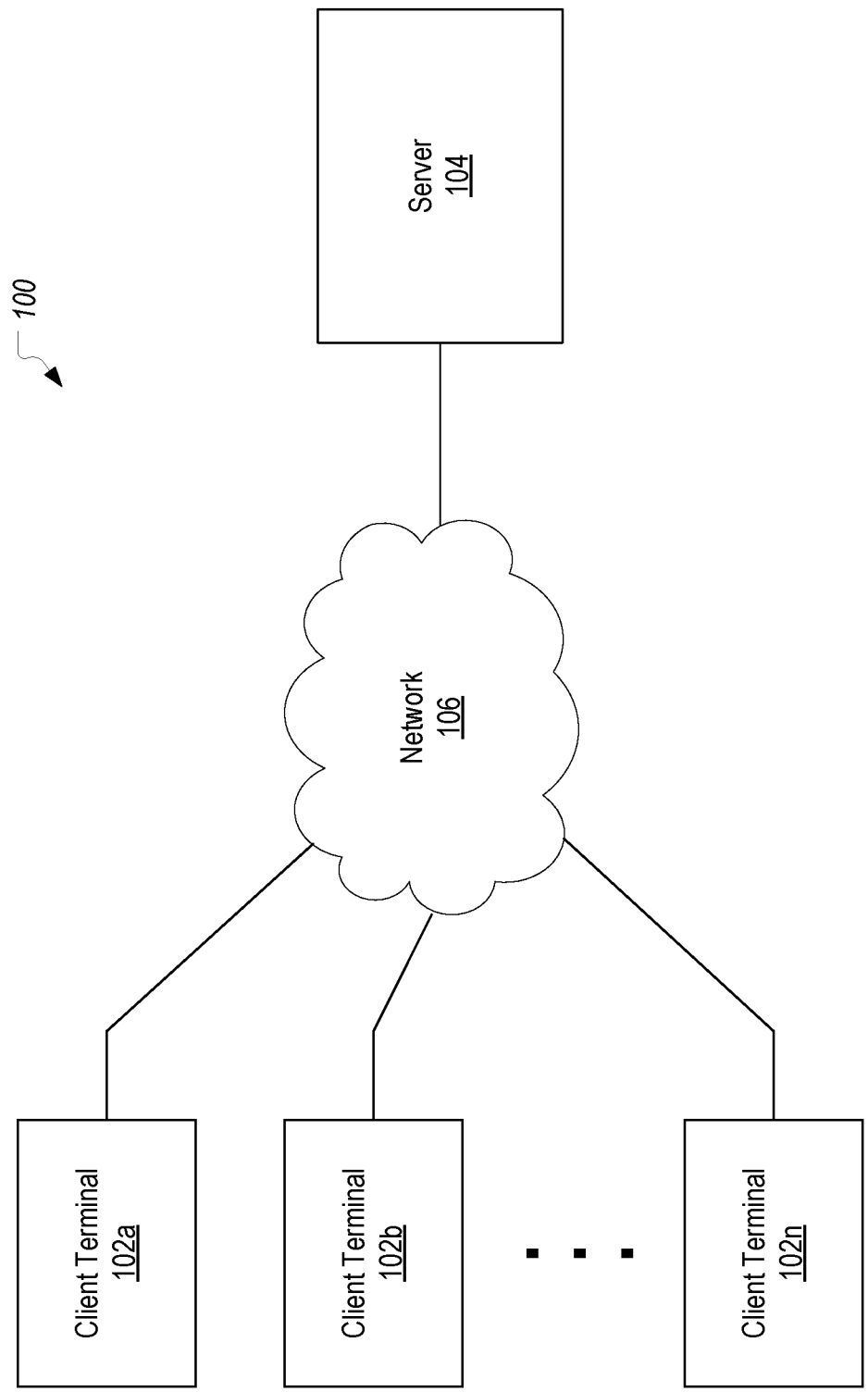
FIG. 1 illustrates an example computing environment in which the present invention can be implemented.
Figure 2:
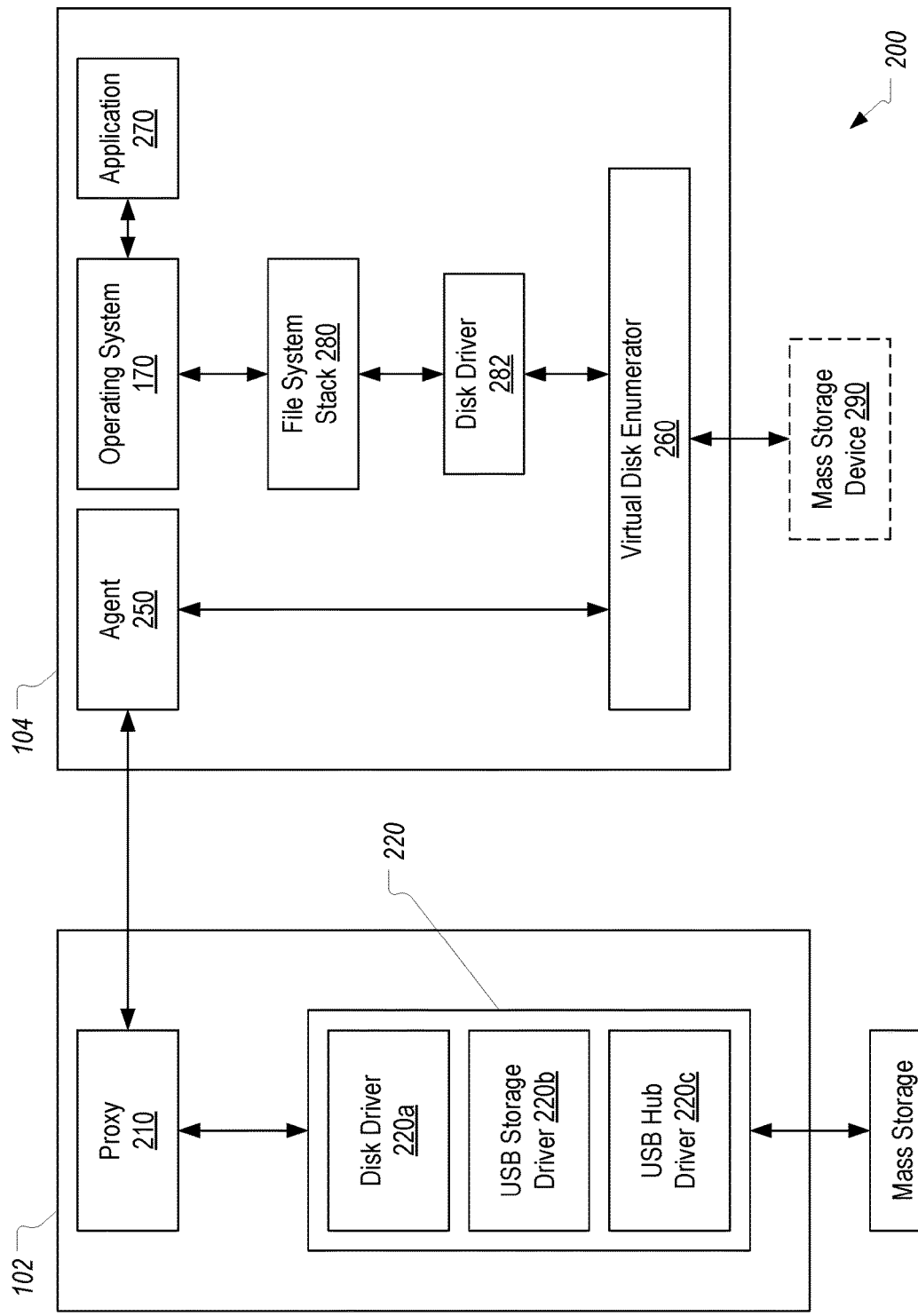
FIG. 2 illustrates how a mass storage device connected to a client can be redirected over a remote session to the server.
Figure 3:
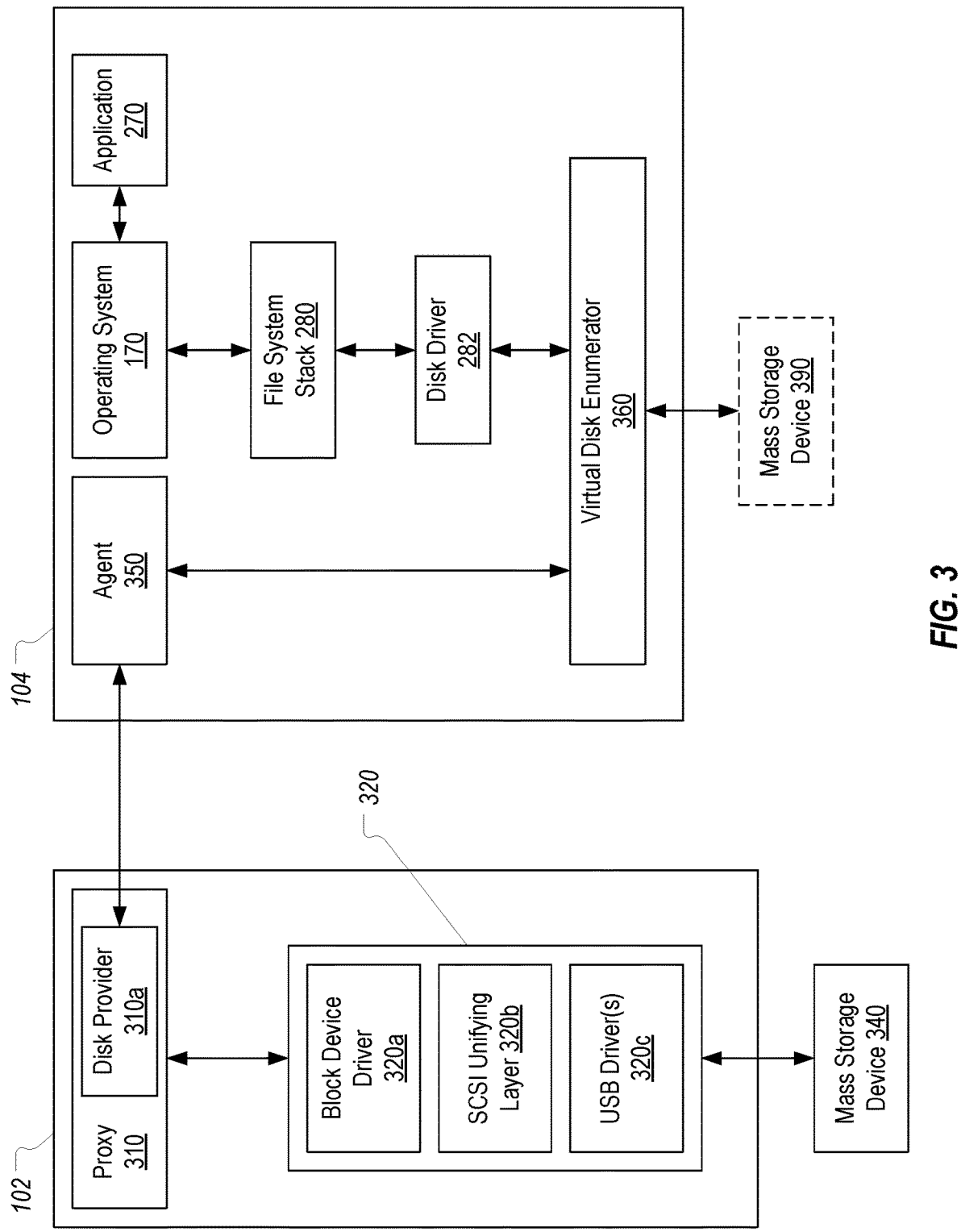
FIG. 3 illustrates a VDI environment in which the present invention can be implemented.

FIG. 3 illustrates an example redirection environment in which the present invention can be implemented. Unlike in FIG. 2 in which it was assumed that client terminal 102 was running Windows, in FIG. 3, it is assumed that client terminal 102 is not running Windows. However, it should be understood that the techniques of the present invention could be implemented when client terminal 102 is running Windows. Importantly, the present invention can be implemented when a Windows-specific disk driver (e.g., disk.sys) is not available (or at least not used) on client terminal 102 such that Windows-specific commands targeting mass storage device 340 cannot simply be forwarded to client terminal 102.

In FIG. 3, mass storage device 340 has been connected to client terminal 102 resulting in non-Windows disk stack 320 being loaded. Disk stack 320 includes a block device driver 320a, a SCSI unifying layer 320b, and USB driver(s) 320c. As is known in the art, block device driver 320a can be configured to provide access to mass storage device 340 by implementing methods such as open( ), release( ), ioctl( ), etc. As is also known in the art, SCSI unifying (or mid level) layer 320b functions as an intermediary between block device driver 320a and the lower level USB specific driver(s) 320c.

As was introduced in the background, because block device driver 320a is not a Windows driver, it is not possible to submit Windows-specific commands to block device driver 320a. For example, if a Windows control code (or IOCTL) was provided to block device driver 320a, it would not know how to handle it. In the environment depicted in FIG. 3, however, operating system 170 is Windows and therefore IO commands targeting mass storage device 340 will be in the form of Windows IOCTLs.

To address this mismatch between operating system 170 and disk stack 320, and in accordance with embodiments of the present invention, various changes can be made to the virtual desktop infrastructure described in the background. For example, proxy 310 can be configured to include a disk provider 310a, while agent 350 and virtual disk enumerator 360 can be configured to perform various functionalities to allow a Windows file system (e.g., file system stack 280) to be attached to the non-Windows disk stack 320.

As an overview, on the client side, disk provider 310a can be configured to perform two general functions: (1) obtain "disk information" from mass storage device 340 and report the disk information to agent 350; and (2) handle access commands targeting mass storage device 340. The term "disk information" should be construed as encompassing one or more of: disk length/size, sector size, tracks per cylinder, sectors per track, bytes per sector, media type (e.g., removable or fixed hard disk), vendor Id, product Id, serial Id (or complete SCSI INQUIRY data), or whether write access is allowed. As mentioned above, access commands will typically include opening or closing the disk, flushing cache to the disk, reading and writing (whether sector or raw), etc.

On the server side, agent 350 can be configured to receive the disk information from disk provider 310a and relay it to virtual disk enumerator 360. Using the disk information, virtual disk enumerator 360 (which can be a virtual storport/miniport driver) can cause disk stack 320 to appear as if it were a Windows disk stack on server 104. Accordingly, virtual disk enumerator 360 will receive IO commands targeting mass storage device 340. To handle the mismatch, virtual disk enumerator 360 can employ the disk information to directly handle any management commands (i.e., without forwarding the management commands to disk stack 320) while routing any access commands to disk provider 310a via agent 350. In this way, virtual disk enumerator 360 will cause disk stack 320 to appear to operating system 170 (including file system stack 280 and disk driver 282) as if it were a Windows stack. Accordingly, the present invention can be implemented without altering operating system 170.

Figure 4A:
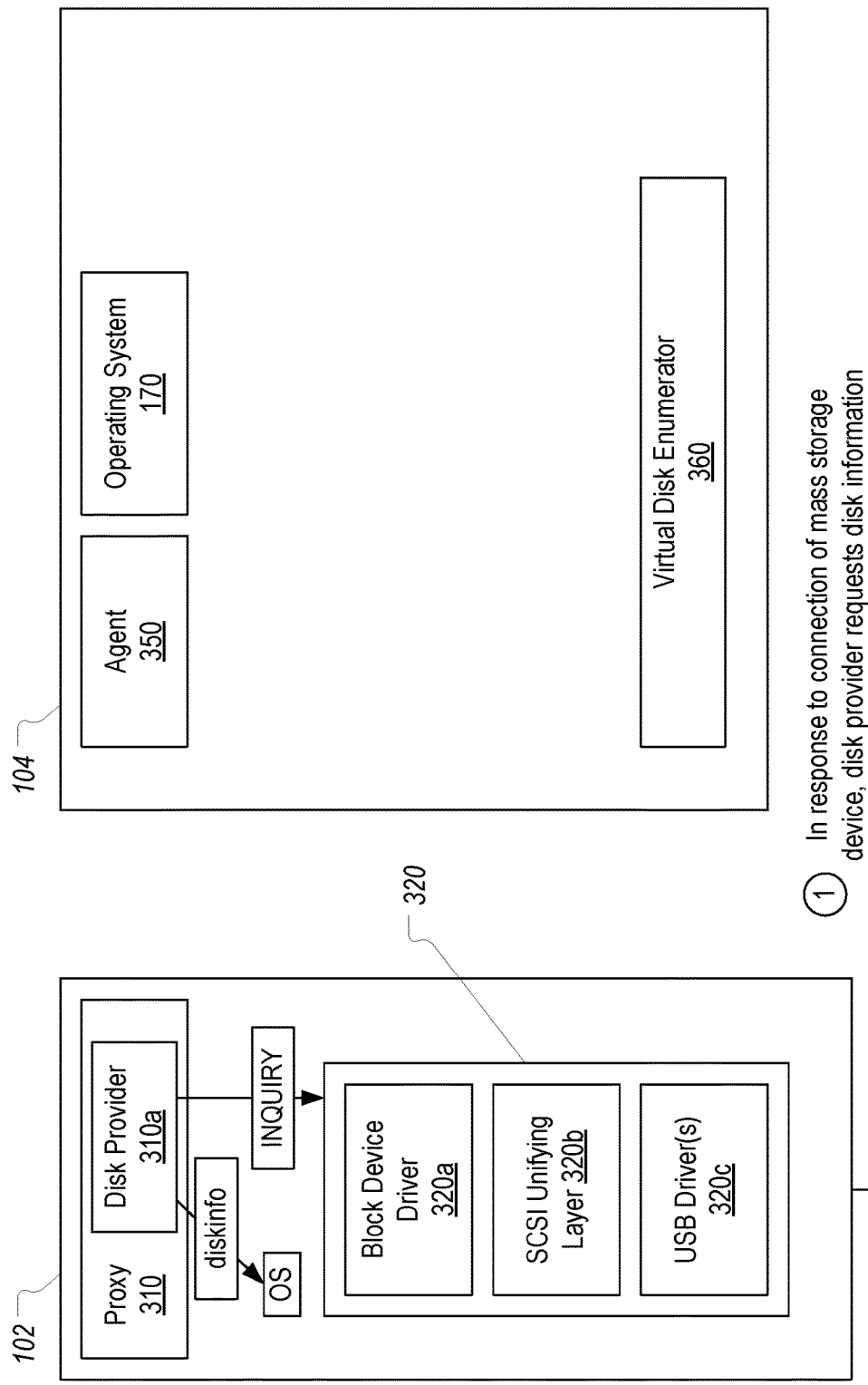
FIG. 4A-4D illustrate various steps that can be performed to allow a server-side Windows file system to be attached to a client-side non-Windows disk stack.

FIGS. 4A-4D illustrate an example of how disk provider 310a and virtual disk enumerator 360 can interoperate to cause disk stack 320 to be emulated as a Windows stack on server 104. Assuming client terminal 102 is configured to redirect a mass storage device, and in response to mass storage device 340 being connected to client terminal 102 while client terminal 102 and server 104 have established a remote display protocol connection, disk provider 310a can obtain disk information from/about mass storage device 340 in step 1 as shown in FIG. 4A. The exact manner in which disk provider 310a obtains the disk information may vary depending on the operating system of client terminal 102.

As part of loading disk stack 320, the operating system on client terminal 102 may be configured to obtain some types of disk information (e.g., disk size, sector size, tracks per cylinder, sectors per track, bytes per sector, media type, whether write access is allowed, etc.) from mass storage device 340 and may then provide means for obtaining this disk information. For example, some Unix or Linux operating systems provide a blockdev, fdisk, format, diskinfo or other similar command that can be used to obtain various types of disk information. In FIG. 4A, disk provider 310a is shown as issuing a "diskinfo" command to generically represent that some of the disk information may be obtained from the operating system. Alternatively, disk provider 310a may be configured to query mass storage device 340 directly for such information. Additionally, FIG. 4A shows that disk provider 310a may employ one or more SCSI INQUIRY commands to retrieve some disk information directly from mass storage device 340 such as the vendor ID, product ID, and serial number. In short, the exact manner in which disk provider 310a obtains disk information from/about mass storage device 340 is not essential to the invention.

Figure 4B:
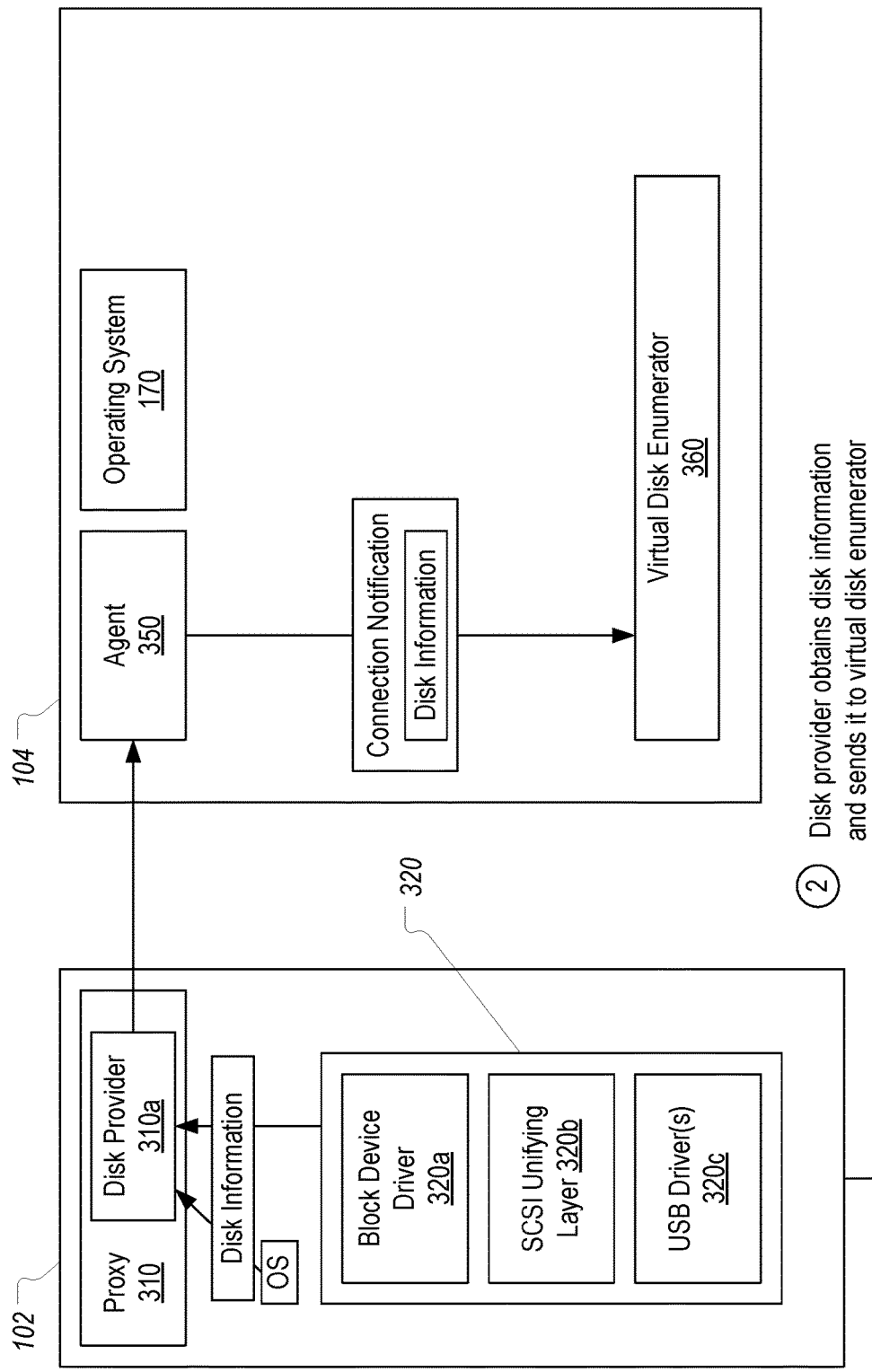

Of primary importance is the fact that disk provider 310a obtains this disk information for the purpose of sending it to virtual disk enumerator 360 via agent 350. Accordingly, FIG. 4B represents that, in step 2, disk provider 310a obtains disk information from mass storage device 340 and/or from the operating system and sends the disk information to agent 350 (as part of a device connection notification). Agent 350 can then forward this disk information (as part of the device connection notification) to virtual disk enumerator 360.

Figure 4C:
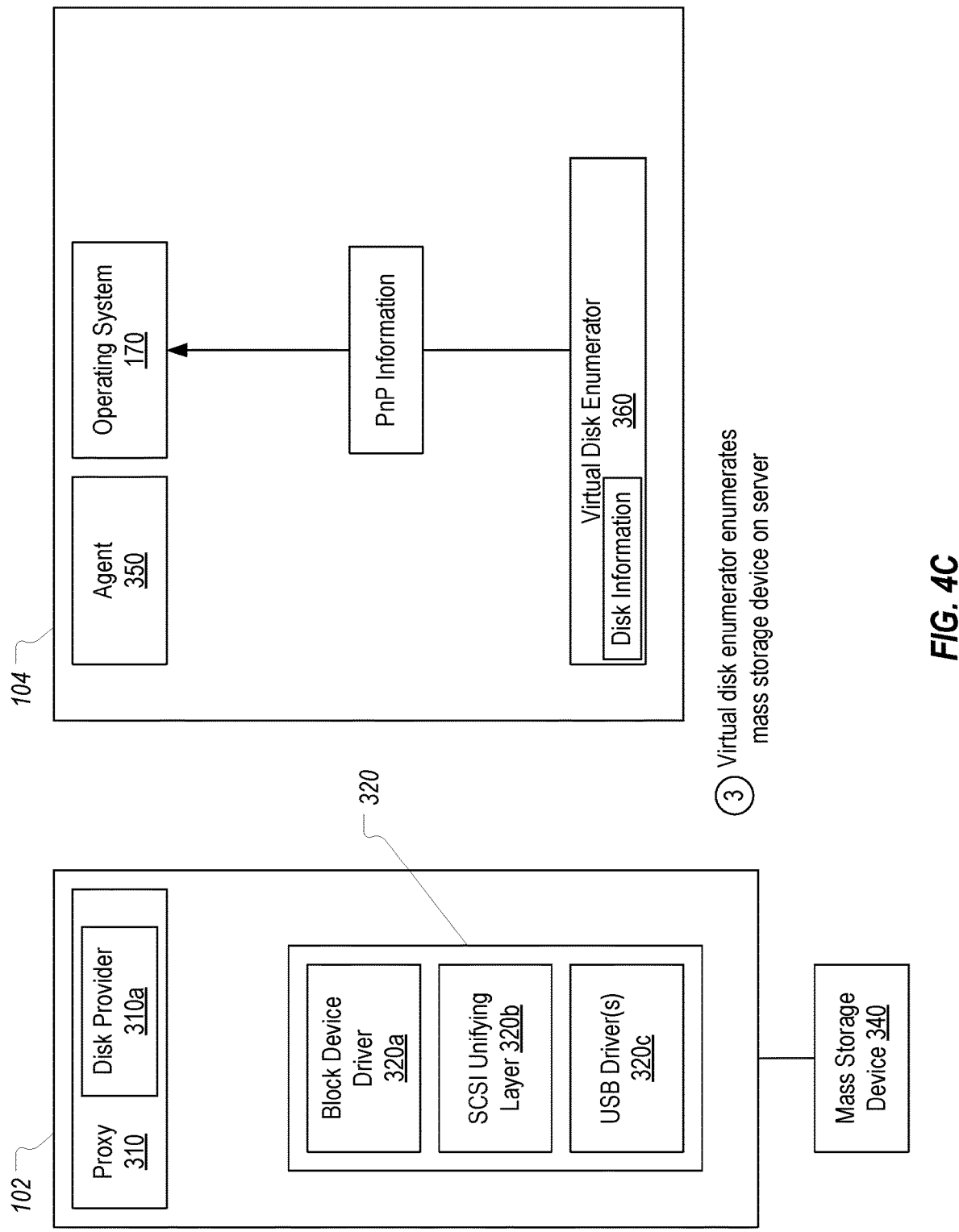

In step 3 as shown in FIG. 4C, once virtual disk enumerator 360 has received the device connection notification (which includes the disk information), virtual disk enumerator 360 will enumerate mass storage device 340 to the plug and play component of operating system 170. As is known, this enumeration includes providing sufficient information ("PnP information" which may be a subset of the disk information) such as an identifier to allow operating system 170 to load the appropriate driver(s). Virtual disk enumerator 360 can also retain the disk information that was included in (or otherwise provided with) the device connection notification to be used in the manner described in detail below.

Figure 4D:
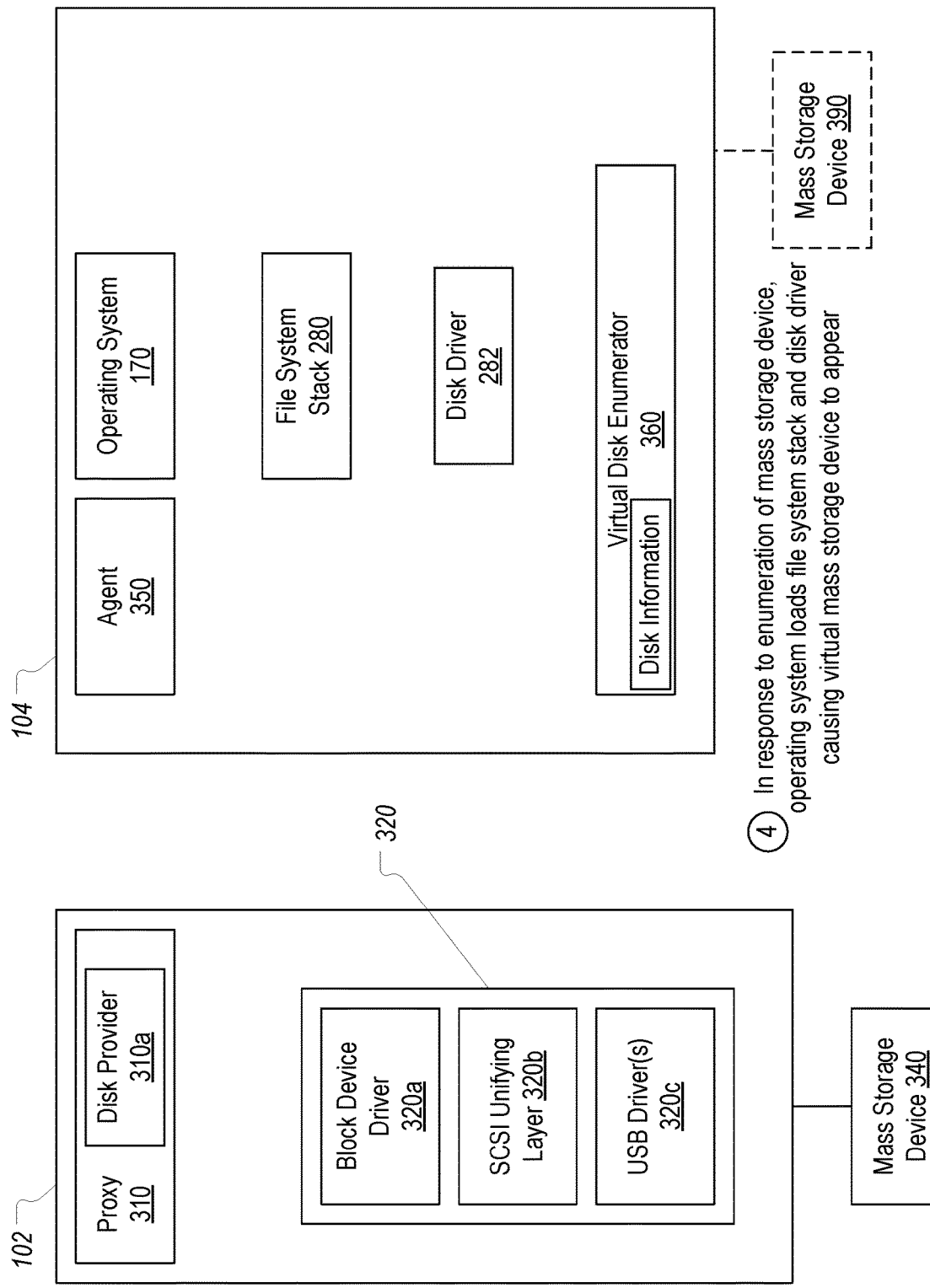

Finally, in FIG. 4D, operating system 170 is shown as having loaded disk driver 282 and file system stack 280 (using the disk information obtained from virtual disk enumerator 360 as will be described below) which will cause mass storage device 340 to appear as virtual mass storage device 390 on server 104. As shown, virtual disk enumerator 360 will be positioned at the bottom of the server-side device stack for mass storage device 340/390 such that IO commands targeting mass storage device 340 will be routed to virtual disk enumerator 360. Also, because virtual disk enumerator 360 stores the disk information for mass storage device 340, virtual disk enumerator 360 can directly handle a number of management commands that operating system 170 employs to properly load file system stack 280 and to subsequently provide access to mass storage device 340.

Figure 5A:
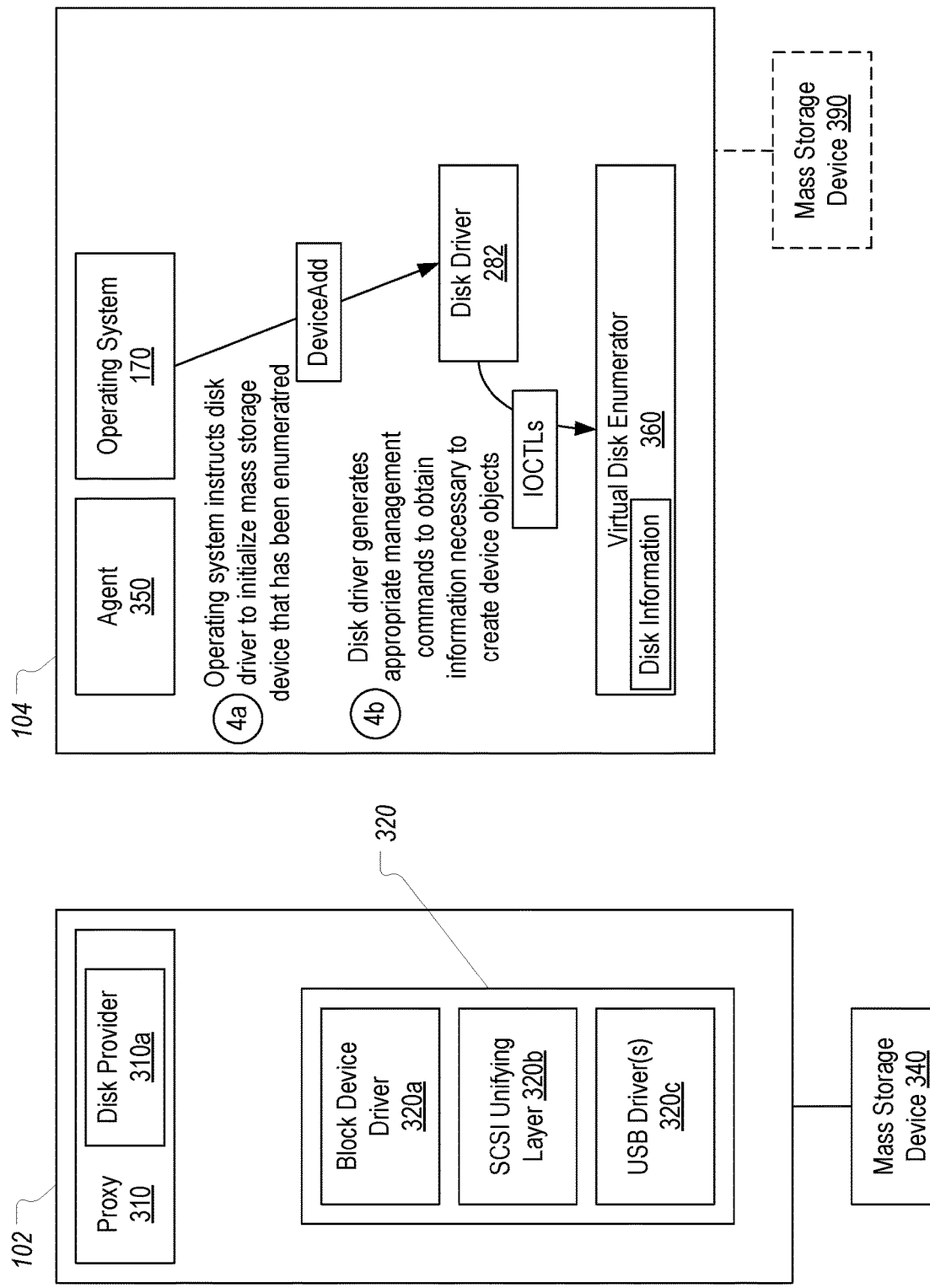
FIGS. 5A and 5B illustrate how a virtual disk enumerator can directly handle management commands that target a mass storage device that is redirected from a non-Windows client terminal to a Windows server.
Figure 5B:
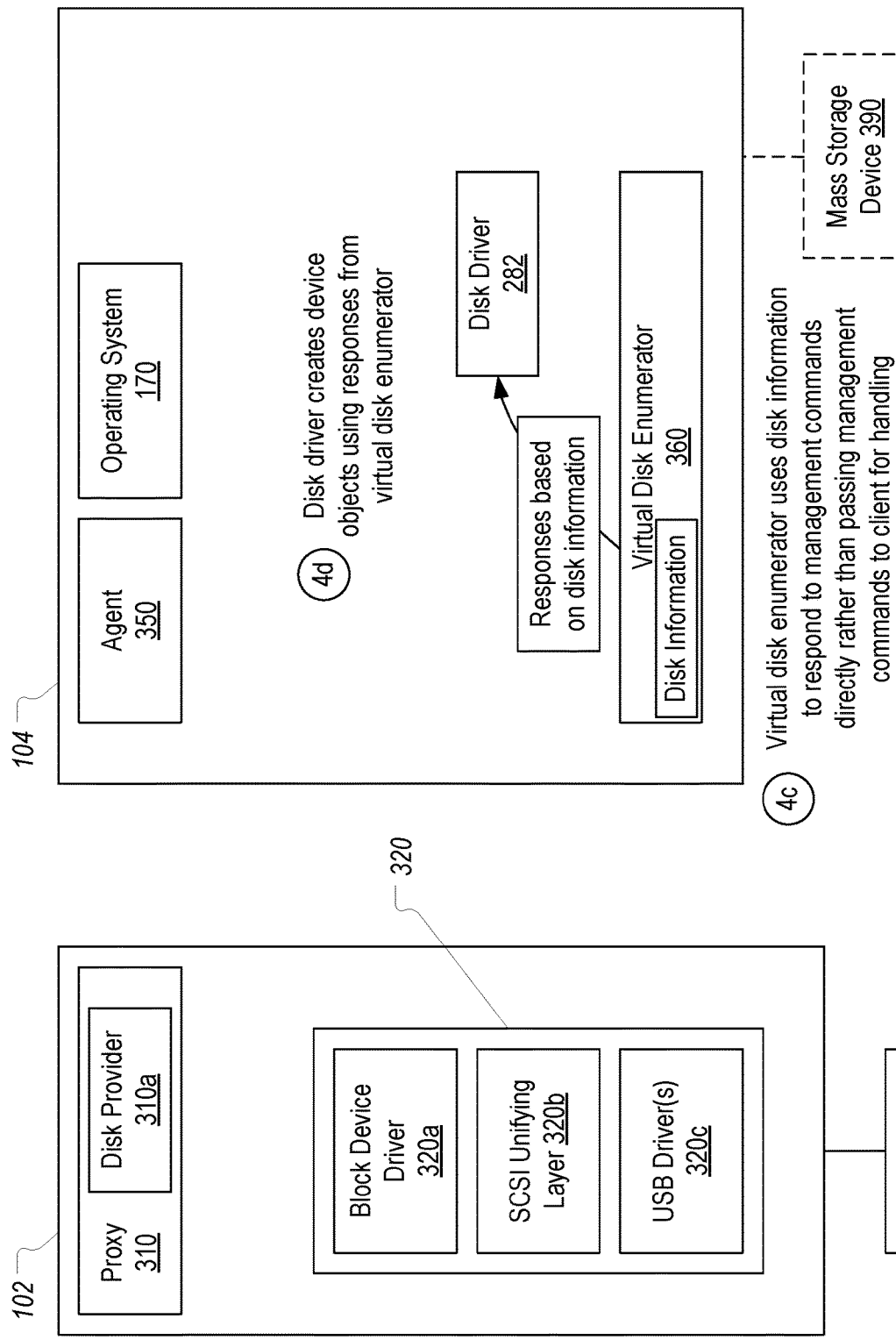

FIGS. 5A and 5B provide a more detailed example of the processing that is performed by virtual disk enumerator 360 in step 4 (i.e., the processing that is performed to load the device stack and file system stack for mass storage device 340). In FIG. 5A, it is assumed that operating system has obtained the appropriate identifier(s) of mass storage device 340 from virtual disk enumerator 360 to allow disk driver 282 to be loaded. As part of this loading and in step 4a shown in FIG. 5A, operating system 170 will call a function of disk driver 282 (e.g., the EvtDriverDeviceAdd function) to allow disk driver 282 to create the necessary device objects for mass storage device 340's device stack and perform any other initialization functions. In response, in step 4b, disk driver 282 can generate appropriate management commands to obtain the information necessary to create device objects (e.g., a functional device object of type FILE_DEVICE_DISK and one or more physical device objects of type FILE_DEVICE_MASS_STORAGE to represent mass storage device 340 and one or more file system device objects to represent the file system on mass storage device 340).

Because disk driver 282 is a Windows component, the management commands that it generates in step 4b to obtain this information will be Windows-specific (as represented by IOCTL in FIG. 5A). For example, disk driver 282 may send management commands such as an IOCTL_STORAGE_READ_CAPACITY command to obtain the geometry information of mass storage device 340, an IOCTL_STORAGE_QUERY_PROPERTY command to obtain various properties of mass storage device 340, an IOCTL_DISK_IS_WRITABLE command to determine whether mass storage device 340 is read only or read-write, or an IOCTL_DISK_VERIFY command to verify a disk extent of mass storage device 340 to name just a few.

Turning to FIG. 5B, when virtual disk enumerator 360 receives these management commands from disk driver 282, it can determine whether they must be directed to mass storage device 340 (i.e., whether they are management commands or access commands). In this case, because they are management commands, virtual disk enumerator 360 can use the disk information it previously received to respond appropriately. Therefore, in step 4c, virtual disk enumerator 360 returns responses that it generated directly using the disk information (i.e., without passing the management commands on to client terminal 102). In essence, by having the disk information, virtual disk enumerator 360 is able to function as if it were a Windows disk stack on client terminal 102 for the purpose of handling management commands.

As an example, if virtual disk enumerator 360 receives an IOCTL_STORAGE_READ_CAPACITY command, it can determine that it can handle the command directly using the disk information it received for mass storage device 340, namely by extracting the geometry information from the disk information and including it in an appropriately configured response. To emphasize the distinction, if client terminal 102 were running Windows, virtual disk enumerator 360 would instead be able to forward the IOCTL_STORAGE_READ_CAPACITY command to client terminal 102 for handling by the client-side Windows-specific disk stack. In this case, however, disk stack 320, as a non-Windows stack, would not understand the IOCTL_STORAGE_READ_CAPACITY command. Therefore, by providing the disk information to virtual disk enumerator 360 to allow it to handle these Windows-specific commands directly, virtual disk enumerator 360 will hide the fact that client terminal 102 is not running Windows. More importantly, this hiding will allow the server-side components above virtual disk enumerator 360 to function in their typical manner without being aware that mass storage device 340 is coupled to a non-Windows operating system. In particular, during the creation of the device stack, disk driver 282 can create the device objects to represent mass storage device 340/390 and the file system(s) of mass storage device 340 in a typical manner based on the disk information that virtual disk enumerator 360 provided as represented by step 4d.

In typical use cases, the majority of management commands are issued during the creation of the device stack and the attachment of the file system. However, even after this initial process and for as long as mass storage device 340 is being redirected, any higher layer component (e.g., disk driver 282, operating system 170, application 270, etc.) can send management commands targeting mass storage device 340. In the same manner described above, virtual disk enumerator 360 can directly handle all these management commands using the disk information of mass storage device 340. Accordingly, the Windows-specific management commands will not be sent to client terminal 102 (where they would not be understood by disk stack 320) but instead will be handled server-side by virtual disk enumerator 360.

Although the possession of disk information allows virtual disk enumerator 360 to handle management commands directly, for access commands, it will still be necessary to send the access commands to mass storage device 340. However, the same mismatch problem exists in such cases, namely, the access commands generated on server 104 will be Windows specific and disk stack 320 will not be able to understand them. To address this issue, disk provider 310a can be configured to convert access commands between the Windows-specific format and a format suitable for disk stack 320. The exact format that will be suitable for disk stack 320 may vary based on the operating system of client terminal 102. For illustrative purposes, the following example will be based on the assumption that client terminal 102 is running FreeBSD which is a UNIX based operating system.

Figure 6A:
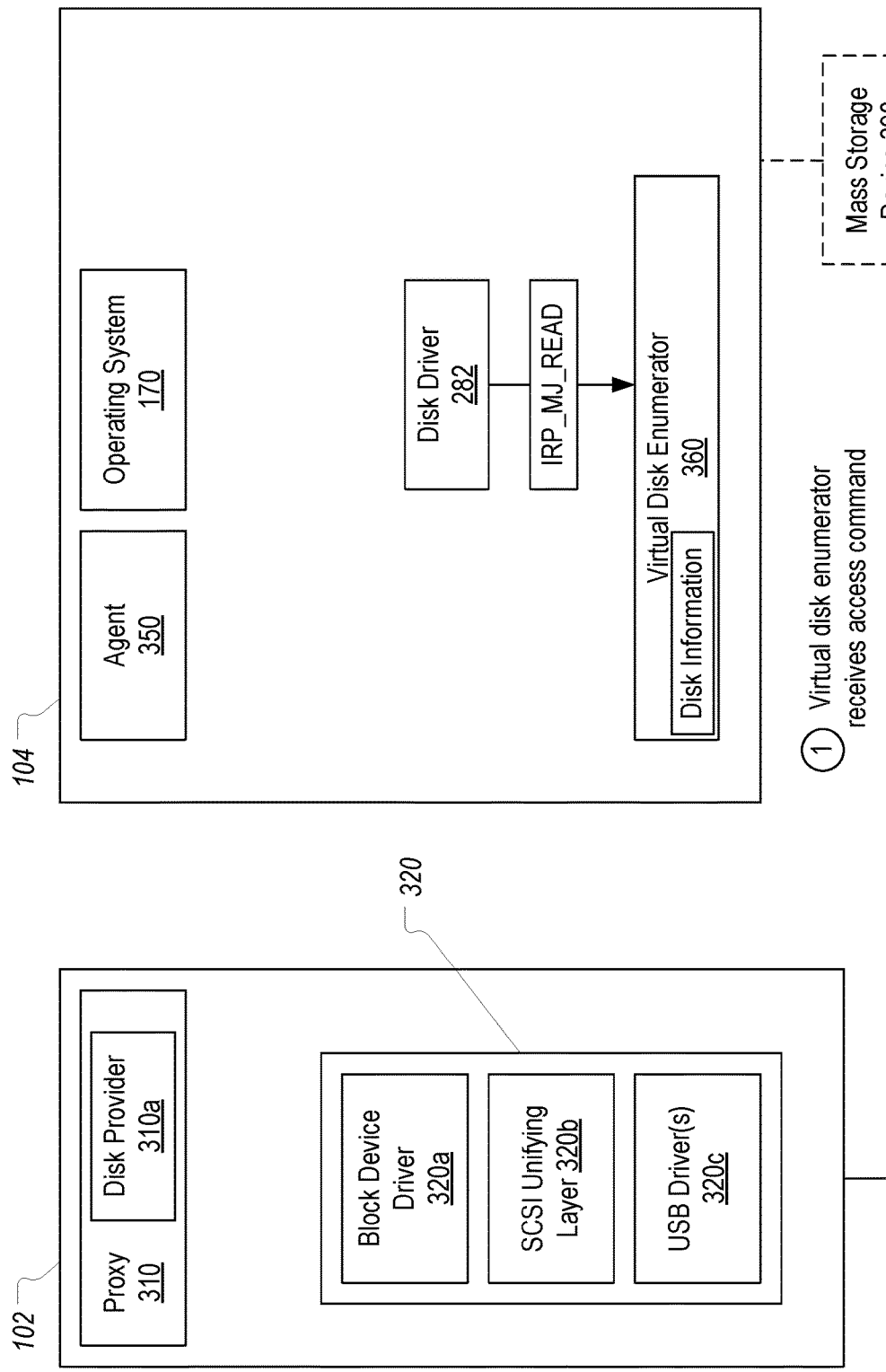
FIGS. 6A-6D illustrate how the virtual disk enumerator can forward access commands to a disk provider to allow the disk provider to convert the access commands to a format suitable for the client-side operating system.
Figure 6B:
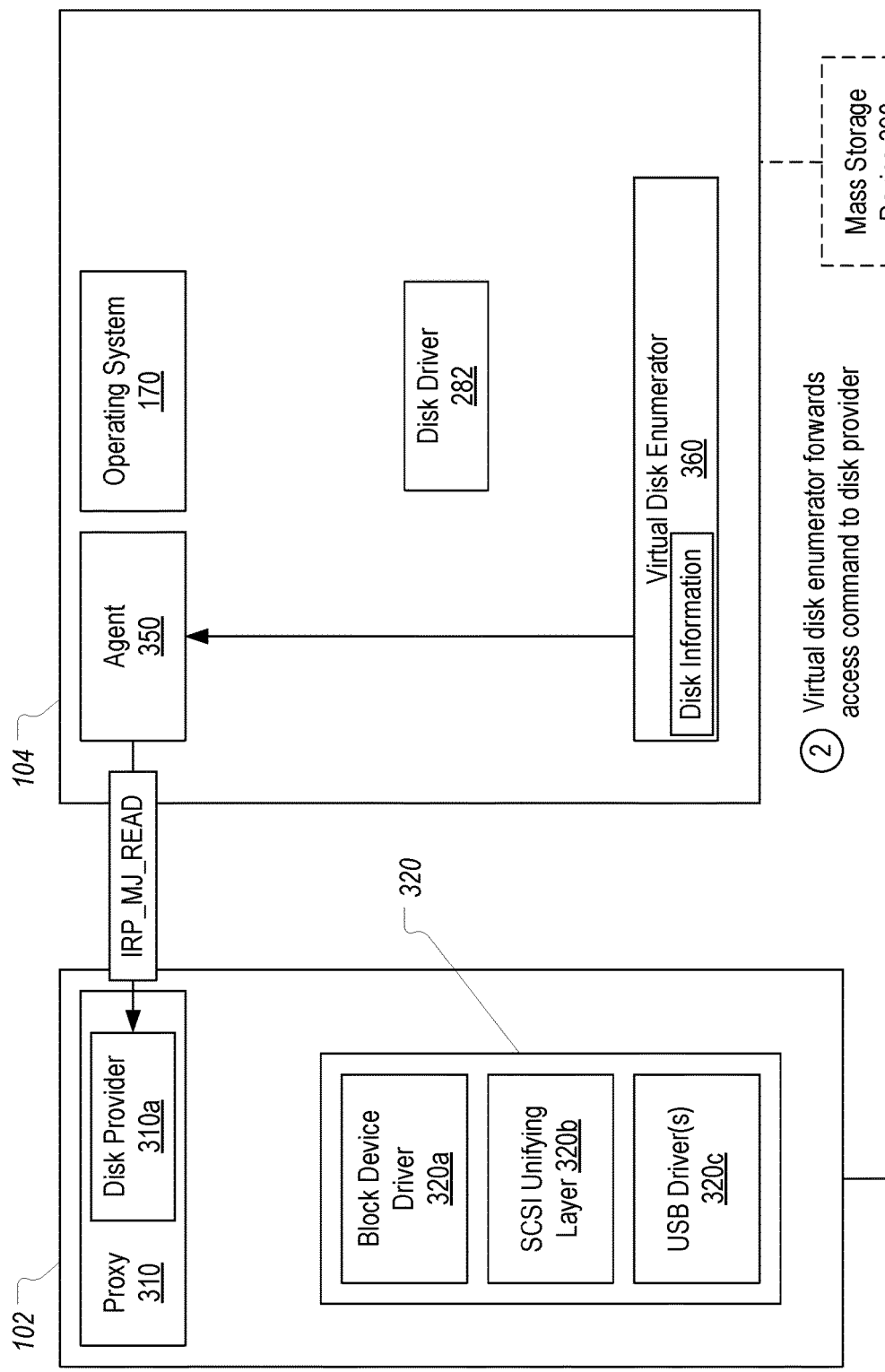

FIG. 6A-6D provide an example of how virtual disk enumerator 360 and disk provider 310a can handle an access command targeting mass storage device 340. In FIG. 6A, virtual disk enumerator 360 is shown as receiving an access command (e.g., in the form of an IRP_MJ_READ command) from disk driver 282 in step 1. Based on the fact that it is a read command rather than a management command, virtual disk enumerator 360 can determine that the access command cannot be handled directly and should therefore be forwarded to client terminal 102. Accordingly, in step 2 shown in FIG. 6B, virtual disk enumerator 360 is shown as sending the access command to agent 350 which in turn routes the access command to disk provider 310a. It is noted that virtual disk enumerator 360 will not simply send the access command as is to disk provider 310a (e.g., since much of an IRP's contents, such as pointers, would be meaningless on client terminal 102 even if client terminal 102 were running Windows). Instead, virtual disk enumerator 360 can send sufficient content of the access command to enable disk provider 310a to create an equivalent access command on client terminal 102. For example, in typical requests, this content may include the disk handle, offset, size, and buffer (among possibly other parameters). Importantly, at least some of this content will be Windows-specific content.

Figure 6C:
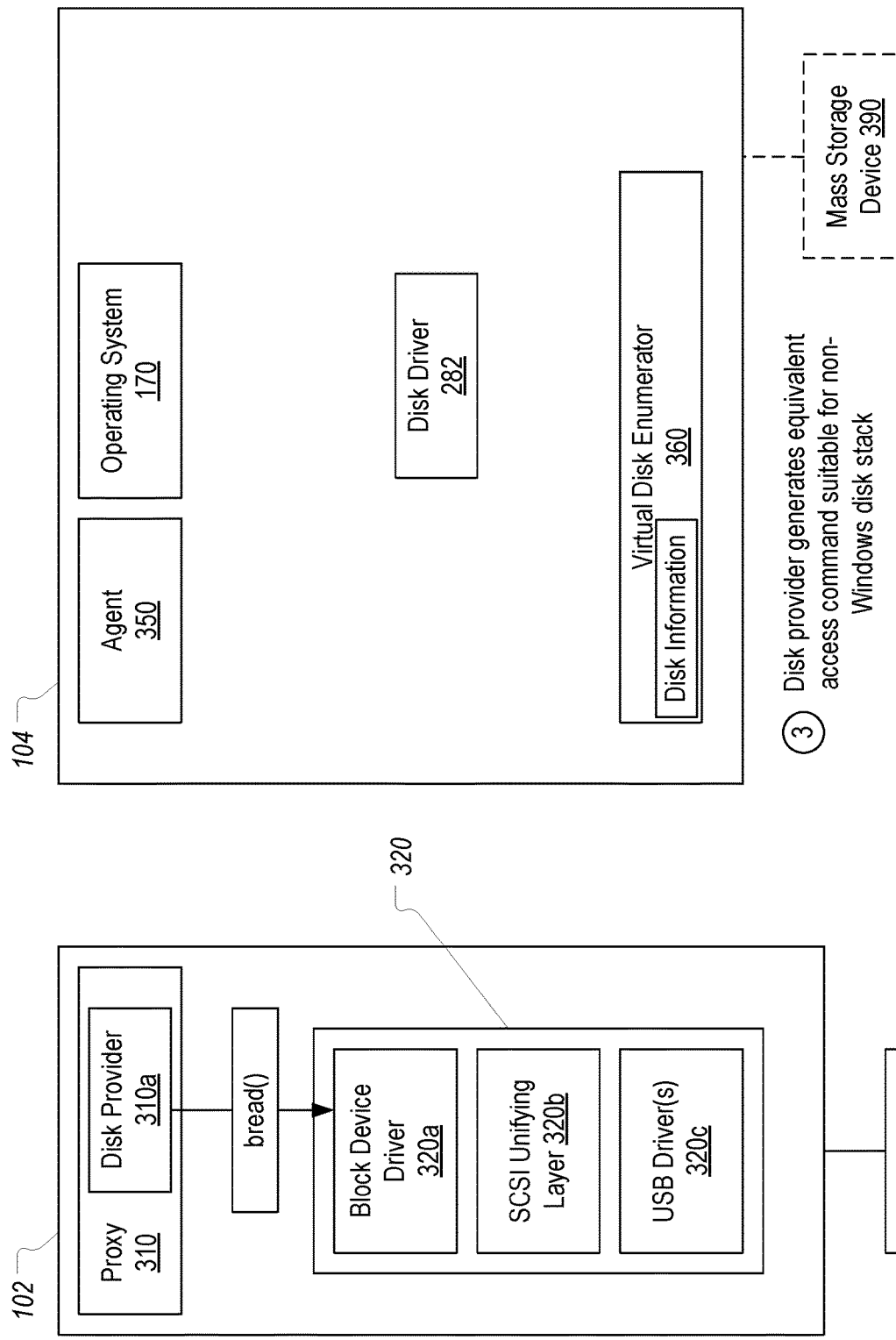
Figure 6D:
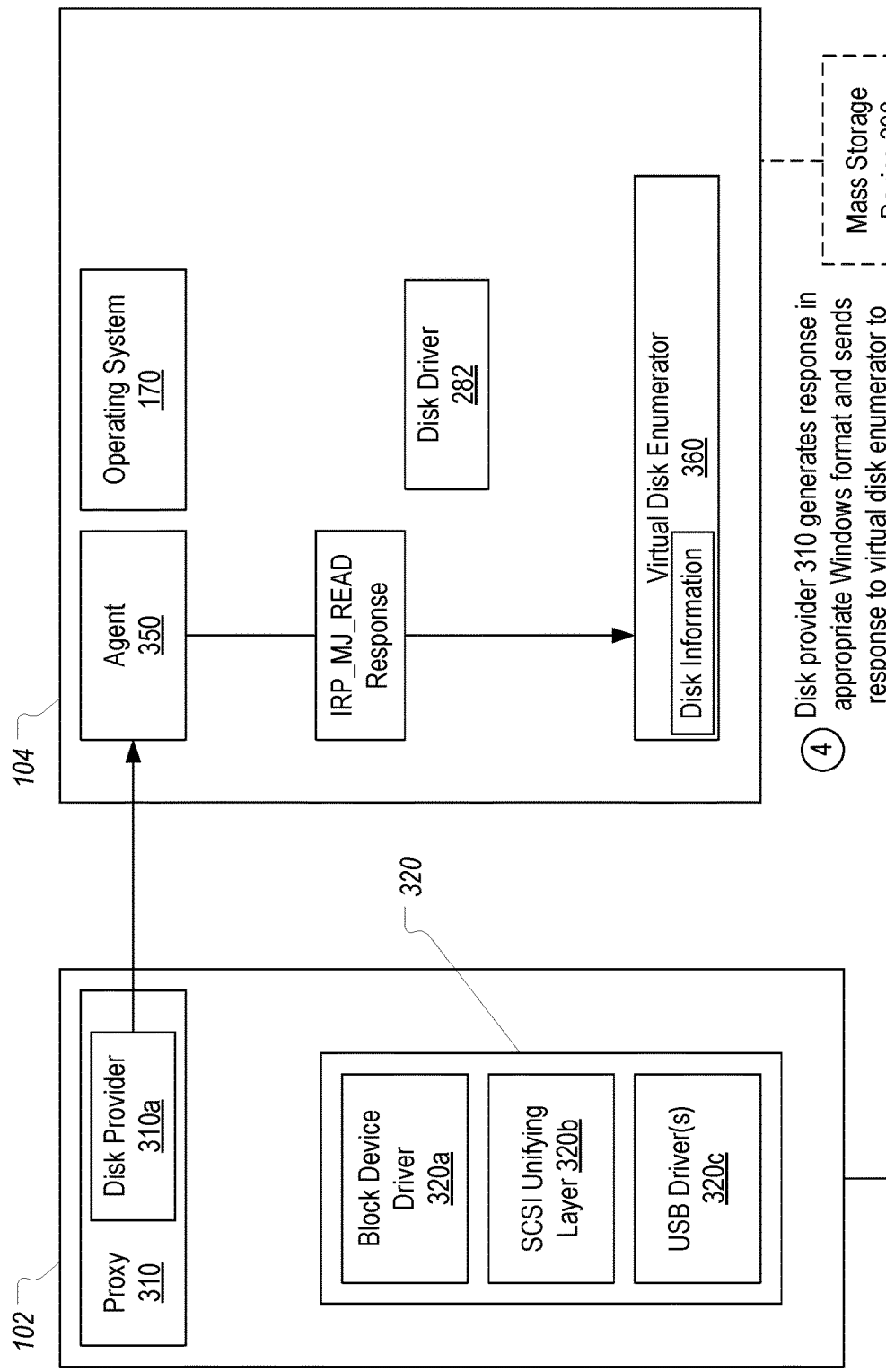

Next, in step 3 shown in FIG. 6C, disk provider 310a will use the Windows-specific content of the access command received from virtual disk enumerator 360 to generate an equivalent access command that is suitable for disk stack 320. For example, assuming client terminal 102 is running FreeBSD, disk provider 310a can convert the Windows-specific offset to a block number (which can be accomplished using the disk information) and call bread( ) using the disk handle, block number, a local buffer, and the size as inputs. Then, in step 4 shown in FIG. 6D, disk provider 310a can then include the results of this read in an appropriate formatted response (e.g., a Windows-formatted response (as represented by IRP_MJ_READ response) in which the contents of the local buffer employed in the call to bread( ) are stored in the buffer that was provided in the access command that disk provider 310a received from virtual disk enumerator 360). Upon receiving this response, virtual disk enumerator 360 can extract the read data from the response, place it in the appropriate server-side IRP, and complete the IRP in a typical manner. Thus, from disk driver 282's perspective, the access command will have been completed in a standard way.

Disk provider 310a can perform similar processing when the access command is a write. For example, as with a read, the content of a write that virtual disk enumerator 360 will send to disk provider 310a can include a disk handle, an offset, a size, and a buffer (among possibly other parameters). Again, disk provider 310a can convert the offset to a block number. Disk provider 310a may also copy the contents of the buffer to a local buffer and then call bwrite( ) with the disk handle, block number, local buffer, and size as inputs. When disk provider 310a receives a response to this call to bwrite( ), it can convert the response to an appropriate Windows format and send it to virtual disk enumerator 360 which can then update the server-side IRP appropriately and complete the IRP in a typical manner.

In summary, the client-side disk provider 310a can obtain disk information and provide it to the server-side virtual disk enumerator 360 to allow virtual disk enumerator 360 to directly handle management commands. For access commands, virtual disk enumerator 360 can route the access commands to disk provider 310a to allow disk provider 310a to generate equivalent access commands suitable for the non-Windows client-side disk stack. In this way, a server-side Windows file system can be attached to a client-side non-Windows disk stack in a way that is transparent to the server-side operating system. Assuming proxy 310 is not a component of the client-side operating system, this process will also be transparent to the client-side operating system. The present invention therefore allows a mass storage device to be redirected at the disk level from a non-Windows client terminal to a Windows server.

Figure 7:
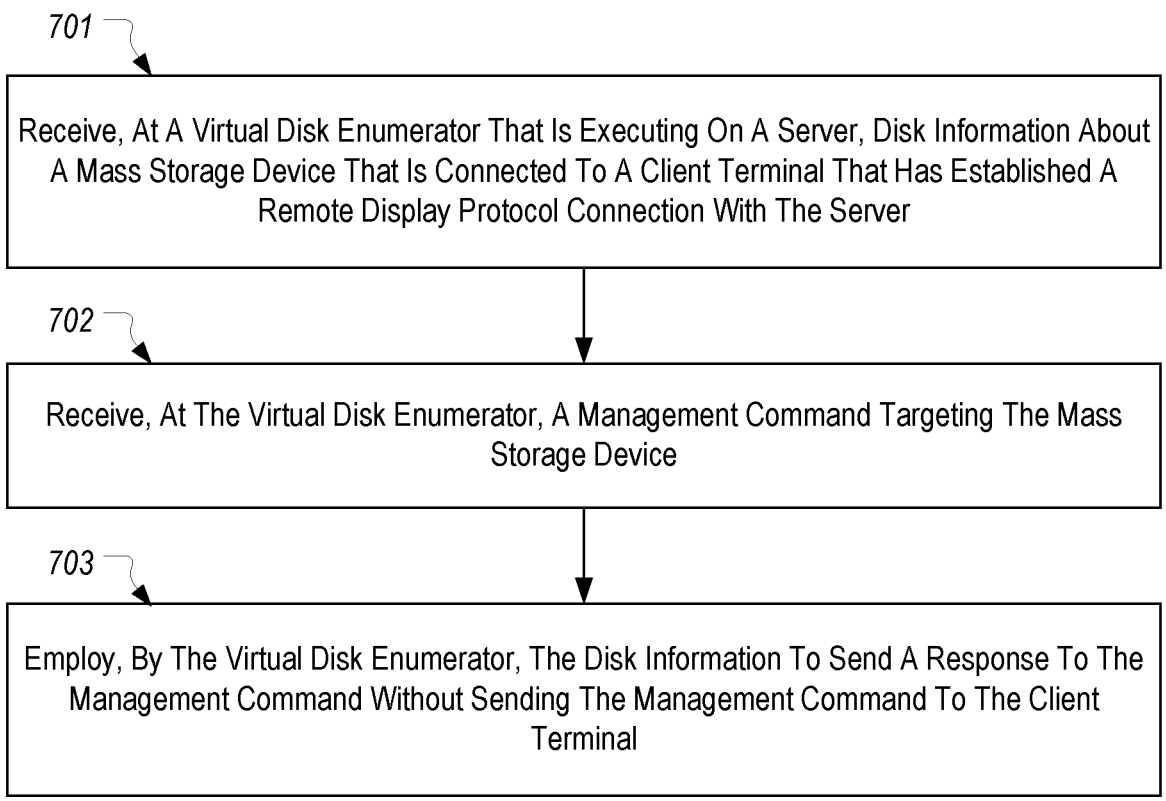
FIG. 7 provides a flowchart of an example method for redirecting a mass storage device.

FIG. 7 provides a flowchart of an example method 700 for redirecting a mass storage device. Method 700 can be implemented by a virtual disk enumerator in a virtual desktop infrastructure environment such as virtual disk enumerator 360.

Method 700 includes an act 701 of receiving, at a virtual disk enumerator that is executing on a server, disk information about a mass storage device that is connected to a client terminal that has established a remote display protocol connection with the server. For example, virtual disk enumerator 360 can receive disk information about mass storage device 340.

Method 700 includes an act 702 of receiving, at the virtual disk enumerator, a management command targeting the mass storage device. For example, virtual disk enumerator 360 can receive a Windows IOCTL or other type of management command during or after creation of a device stack and file system stack for mass storage device 340 on server 104.

Method 700 includes an act 703 of employing, by the virtual disk enumerator, the disk information to send a response to the management command without sending the management command to the client terminal. For example, virtual disk enumerator 360 can respond to an IOCTL directly using the disk information for mass storage device 340 rather than sending the IOCTL to client terminal 102.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented in a virtual desktop infrastructure environment, for redirecting a mass storage device, which has been connected to a client terminal that has loaded a non-Windows disk stack for purposes of enabling access to the mass storage device, to a server that is executing a Windows operating system, the method comprising:
    in conjunction with the client terminal establishing a remote display protocol connection with the server to thereby establish a remote session on the server within the virtual desktop infrastructure environment, receiving, at a virtual disk enumerator that is executing on the server as part of the virtual desktop infrastructure environment, disk information about the mass storage device for which the non-Windows disk stack has been loaded on the client terminal, the non-Windows disk stack not including a Windows-specific disk driver;
    employing, by the virtual disk enumerator, the disk information to enumerate the mass storage device on the server to thereby cause a Windows-specific disk driver for the mass storage device to be loaded on the server as part of the virtual desktop infrastructure environment, the loading of the Windows-specific disk driver causing the mass storage device to become accessible within the remote session that the client terminal established on the server as part of the virtual desktop infrastructure environment;
    receiving, by the virtual disk enumerator and from the Windows-specific disk driver, Windows-specific commands that originate from the remote session established by the client terminal to which the mass storage device is connected, the Windows-specific commands targeting the mass storage device that is connected to the client terminal, the Windows-specific commands including Windows-specific management commands and Windows-specific access commands;
    selectively handling, by the virtual disk enumerator, the Windows-specific commands received from the Windows-specific disk driver, including:
        receiving, at the virtual disk enumerator and from the Windows-specific disk driver, a Windows-specific management command targeting the mass storage device;
        employing, by the virtual disk enumerator, the disk information to send a response to the Windows-specific management command to the Windows-specific disk driver without sending the Windows-specific management command to the client terminal where the non-Windows disk stack has been loaded as part of the virtual desktop infrastructure environment to enable access to the mass storage device;
        receiving, at the virtual disk enumerator and from the Windows-specific disk driver, a Windows-specific access command targeting the mass storage device; and
        forwarding the Windows-specific access command to the client terminal to enable a disk provider that executes on the client terminal as part of the virtual desktop infrastructure environment to generate a non-Windows-specific equivalent access command for submission to the non-Windows disk stack.

2. The method of claim 1, wherein the disk information is received from the disk provider that is executing on the client terminal.

3. The method of claim 1, wherein the Windows-specific management command is received during a process of creating one or more device objects to represent the mass storage device on the server.

4. The method of claim 1, wherein the Windows-specific management command is received after a device stack and a file system stack have been created on the server for the mass storage device.

5. The method of claim 1, wherein the disk information includes one or more of: disk length or size, sector size, tracks per cylinder, sectors per track, bytes per sector, media type, SCSI vendor Id, SCSI product Id, SCSI serial Id, or whether write access is allowed.

6. The method of claim 1, wherein the Windows-specific management command comprises a command to obtain geometry information.

7. The method of claim 1, wherein the Windows-specific access command comprises a read command or a write command.

8. The method of claim 7, wherein forwarding the Windows-specific access command to the client terminal comprises sending one or more of a disk handle, offset, size, or buffer specified in the Windows-specific access command to the disk provider.

9. The method of claim 8, further comprising:
generating, by the disk provider, the non-Windows-specific equivalent access command.

10. The method of claim 8, wherein generating the non-Windows-specific equivalent access command comprises converting the offset to a block number.

11. The method of claim 9, further comprising:
receiving, by the disk provider, a response to the non-Windows-specific equivalent access command; and
generating and sending a Windows-specific equivalent response to the virtual disk enumerator.

12. The method of claim 1, wherein an operating system of the client terminal is not Windows.

13. One or more computer storage media storing computer executable instructions which when executed implement the following components:
a client-side disk provider of a virtual desktop infrastructure environment that is configured to execute on a client terminal when the client terminal establishes a remote display protocol connection with a server of the virtual desktop infrastructure environment to thereby establish a remote session on the server; and
a server-side virtual disk enumerator that is configured to execute on the server as part of the virtual desktop infrastructure environment;
wherein, when a mass storage device is coupled to the client terminal on which the disk provider is executing while the client terminal has established the remote session on the server and in response to a non-Windows disk stack being loaded on the client terminal for purposes of enabling access to the mass storage device as part of the virtual desktop infrastructure environment, the non-Windows disk stack not including a Windows-specific disk driver, the disk provider is configured to obtain disk information about the mass storage device and send the disk information to the virtual disk enumerator on the server; and
wherein the virtual disk enumerator is configured to use the disk information to enumerate the mass storage device on the server to thereby cause a Windows-specific disk driver for the mass storage device to be loaded on the server as part of the virtual desktop infrastructure environment, the loading of the Windows-specific disk driver causing the mass storage device to become accessible within the remote session that the client terminal established on the server as part of the virtual desktop infrastructure environment;
wherein the virtual disk enumerator is configured to receive, from the Windows-specific disk driver on the server, Windows-specific commands that originate from the remote session established by the client terminal to which the mass storage device is connected, the Windows-specific commands targeting the mass storage device and including Windows-specific management commands and Windows-specific access commands, and, in response to receiving the Windows-specific commands, to selectively handle the Windows-specific commands including employing the disk information to directly handle the Windows-specific management commands that target the mass storage device by using the disk information to provide corresponding responses to the Windows-specific disk driver without sending the Windows-specific management commands to the disk provider and forwarding the Windows-specific access commands that target the mass storage device to the disk provider; and
wherein the disk provider, in response to receiving the Windows-specific access commands, is configured to generate non-Windows-specific equivalent access commands and provide the non-Windows-specific equivalent access commands to the non-Windows disk stack loaded on the client terminal as part of the virtual desktop infrastructure environment.

14. The computer storage media of claim 13, wherein forwarding the Windows-specific access commands to the disk provider comprises sending one or more of a disk handle, offset, size, or buffer specified in the Windows-specific access commands.

15. The computer storage media of claim 14, wherein the disk provider is configured to execute on a non-Windows operating system.

16. The computer storage media of claim 14, wherein the Windows-specific access commands comprise read commands and write commands.

17. One or more computer storage media storing computer executable instructions defining components which when executed implement a virtual desktop infrastructure, the components comprising:
a proxy of the virtual desktop infrastructure that executes on a client terminal that runs a non-Windows operating system, the proxy including a disk provider;
an agent of the virtual desktop infrastructure that executes on a server that runs a Windows operating system, the agent being configured to establish remote display protocol connections with the proxy as part of the virtual desktop infrastructure; and
a virtual disk enumerator of the virtual desktop infrastructure that executes on the server; wherein, when a mass storage device is connected to the client terminal while the proxy has established a remote display protocol connection with the agent to thereby establish a remote session on the server in the virtual desktop infrastructure and a non-Windows disk stack, which does not include a Windows-specific disk driver, is loaded on the client terminal for purposes of enabling access to the mass storage device within the virtual desktop infrastructure, the disk provider obtains disk information about the mass storage device and sends the disk information to the virtual disk enumerator;
wherein the virtual disk enumerator employs the disk information to enumerate the mass storage device on the server to thereby cause a Windows-specific disk driver for the mass storage device to be loaded on the server as part of the virtual desktop infrastructure, the loading of the Windows-specific disk driver causing the mass storage device to become accessible within the remote session that the client terminal established on the server;

wherein the virtual disk enumerator receives, from the Windows-specific disk driver, Windows-specific commands that originate from the remote session established by the client terminal to which the mass storage device is connected, the Windows-specific commands targeting the mass storage device that is connected to the client terminal, the Windows-specific commands including Windows-specific management commands and Windows-specific access commands;

wherein the virtual disk enumerator selectively handles the Windows-specific commands received from the Windows-specific disk driver, the selective handling including directly handling the Windows-specific management commands that target the mass storage device by using the disk information to provide corresponding responses to the Windows-specific disk driver without sending the Windows-specific management commands to the disk provider, and forwarding the Windows-specific access commands that target the mass storage device to the disk provider; and wherein the disk provider, in response to receiving the Windows-specific access commands, generates non-Windows-specific equivalent access commands and provides the non-Windows-specific equivalent access commands to the non-Windows disk stack loaded on the client terminal as part of the virtual desktop infrastructure.

18. The computer storage media of claim 17, wherein providing the non-Windows-specific equivalent access commands to the non-Windows disk stack comprises providing the non-Windows-specific equivalent access commands to a block device driver that is included in the non-Windows disk stack.

19. The computer storage media of claim 17, wherein generating non-Windows-specific equivalent access commands comprises converting an offset included in the Windows-specific access commands to a block number included in the non-Windows-specific equivalent access commands.

\* \* \* \* \*